Jan. 25, 1966   D. C. KORN   3,230,723
APPARATUS FOR COOLING DENTAL CEMENTS
Filed Dec. 18, 1964   2 Sheets-Sheet 1

INVENTOR.
DAVID C. KORN
BY
SCHMIEDING & FULTZ

Jan. 25, 1966   D. C. KORN   3,230,723
APPARATUS FOR COOLING DENTAL CEMENTS
Filed Dec. 18, 1964   2 Sheets-Sheet 2

INVENTOR.
DAVID C. KORN
BY
SCHMIEDING & FULTZ 3,230,723
APPARATUS FOR COOLING DENTAL CEMENTS
David C. Korn, Morgantown, W. Va., assignor of fifty percent to Hoy D. McIntire, Columbus, Ohio
Filed Dec. 18, 1964, Ser. No. 419,508
6 Claims. (Cl. 62—3)

The present invention relates generally to devices for cooling dental cements and particularly to a novel apparatus for use by dentists in cooling dental cements during the mixing process under close temperature control.

An important factor in developing optimum strength, resistance to erosion in the oral fluids, and other important properties in dental cements, is close temperature control of the cement during the mixing process. Use of a mixing slab the temperature of which can be automatically controlled assures attainment of these optimum properties. Prior devices presently used for this purpose are inconvenient which lead many dentists to the fundamental error of neglecting to cool the mixing surface. The result is a disservice to the patient because dental cements mixed under improper temperature conditions have a reduced service life.

In general, the present invention comprises an insulated housing means, a removable mixing slab in the housing means, a thermoelectric module, the cold side being in heat transfer relationship with the mixing slab, means to dissipate the heat generated by the hot side of the module and a temperature control system which automatically senses the temperature of the mixing slab and signals a switch means which turns the power on or off accordingly to maintain the desired temperature.

As an aspect of the present invention, the novel construction of the apparatus for cooling dental cements permits close control of the temperature of the cement during the mixing process.

As another aspect of the present invention, the novel construction of the apparatus provides a more convenient and effective method to cool dental cements than any of the prior devices presently used by dentists.

As another aspect of the present invention, the utilization of a thermoelectric module for cooling the mixing surface makes it possible to efficiently maintain a prescribed mixing slab temperature automatically.

As a further aspect of the present invention, the novel construction of the apparatus permits its manufacture at relatively low cost to afford the average dentist and opportunity to own and use the device and thereby render a better health service to his patients.

It is, therefore, an object of the present invention to provide an apparatus of the type described which will permit control of the temperature of dental cements during the mixing process.

It is another object of the present invention to provide an apparatus of the type described which is more convenient and more effective for cooling dental cements than prior devices presently used by dentists.

It is another object of the present invention to provide an apparatus of the type described which maintains a prescribed mixing slab temperature automatically.

It is a further object of the present invention to provide an apparatus of the type described which may be manufactured, and operated at a relatively low cost.

Further objects and advantages of the present invention will be apparent from the following description, reference being had to the accompanying drawings wherein a preferred form of embodiment of the invention is clearly shown.

Figure 1:
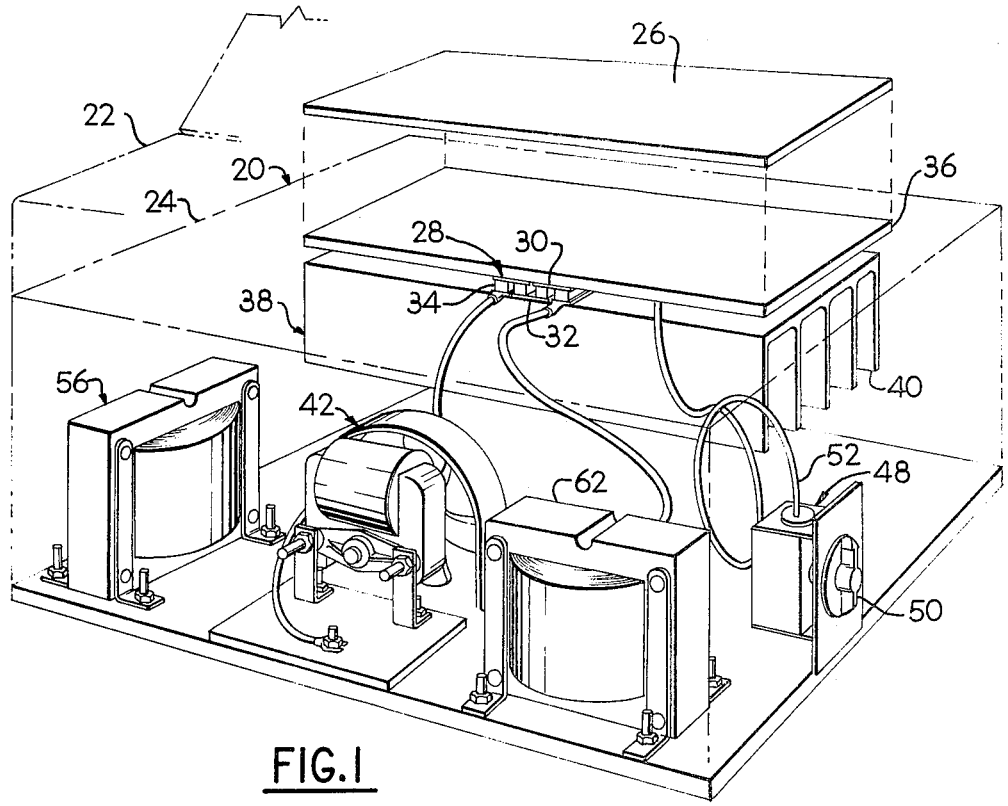
FIG. 1 is a perspective view of an apparatus for cooling dental cements constructed in accordance with the present invention. The view illustrates interior components of the apparatus with the housing means being indicated generally by broken lines.

Referring in detail to the drawings, an apparatus for cooling dental cements constructed in accordance with the present invention is illustrated in FIG. 1.

A housing means, indicated generally at 20, includes an upper compartment 22 hinged to open upwardly and a lower compartment 24. A mixing slab 26 composed of a material of high conductivity, preferably a hardenable grade of stainless steel or a cobalt-chromium alloy, is removably mounted in a depression 25 formed in the bottom of upper compartment 22.

Figure 3:
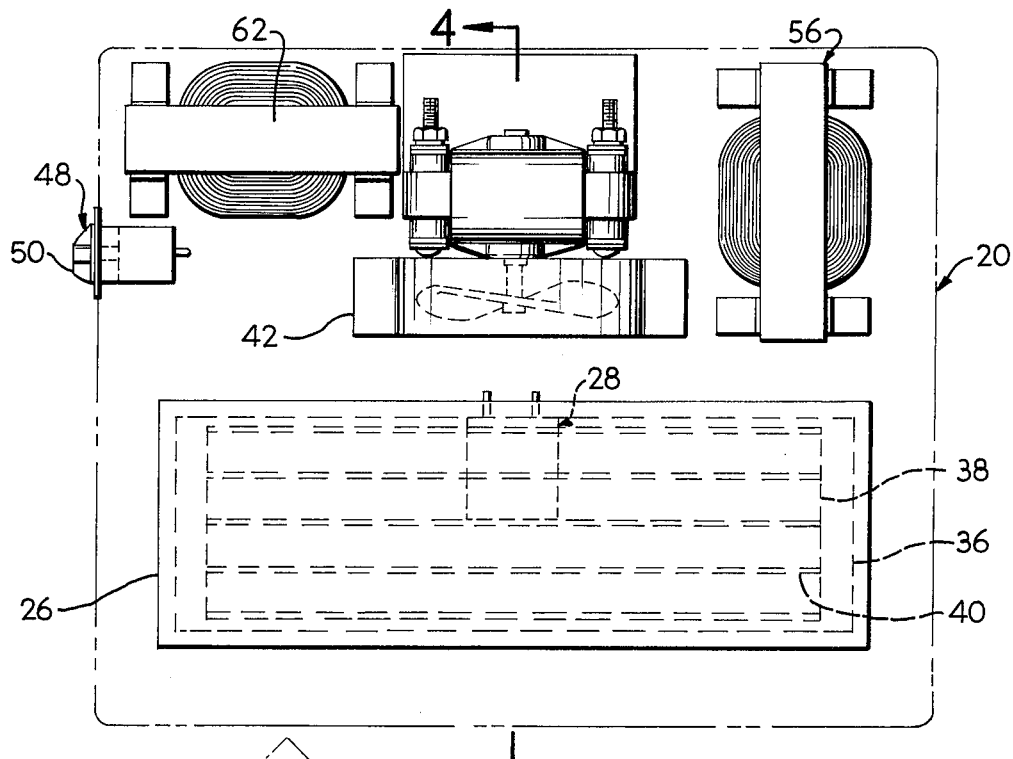
FIG. 3 is a plan view of the apparatus illustrated in FIG. 1.
Figure 4:
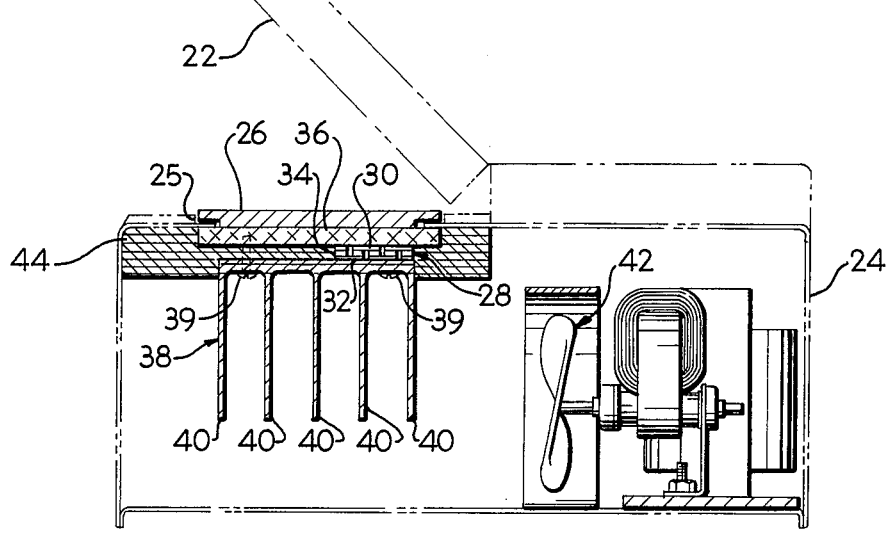
FIG. 4 is a partial side sectional view of the apparatus of the present invention, the section being taken along line 4—4 of FIG. 3.

Referring next to FIGS. 3 and 4, a thermoelectric cooling means in the form of a commercial thermoelectric module, indicated generally at 28, includes a cold side 30 and a hot side 32 with a semi-conducting material 34 disposed between them. The cooling of cold side 30 takes place due to the Peltier effect.

An aluminum plate 36 is cemented to cold side 30 by a commercially prepared dielectric cement which permits the conduction of heat but prevents the flow of electricity between cold side 30 and plate 36. Similarly, another aluminum plate 38, provided with fins 40, is cemented to hot side 32 and bolted to plate 36 by bolts 39. Very little heat can be conducted through bolts 39 therefore the efficiency of cooling slab 26 is not appreciably diminished. The heat generated by hot side 32 is thus conducted through plate 38 and fins 40 to be dissipated by the flow of air generated by a fan means, indicated generally at 42.

Still referring to FIG. 4, an insulating means 44, preferably a plastic foam material, is disposed around module 28 and in between aluminum plates 36 and 38 to prevent heat transfer by connection and radiation from plate 38 to plate 36.

Figure 2:
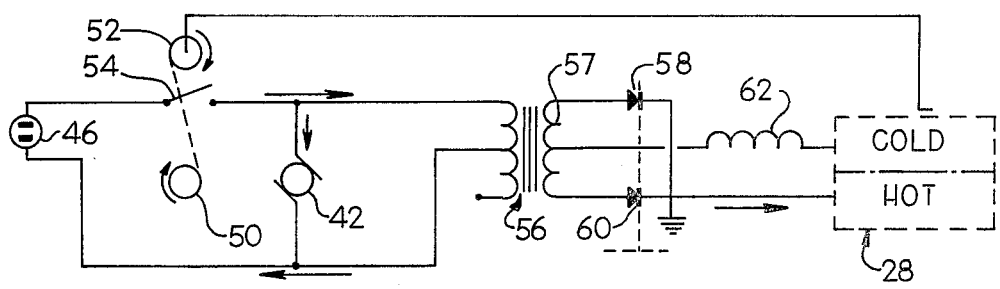
FIG. 2 is a diagrammatic view of the apparatus of the present invention illustrating a preferred circuit arrangement.

Referring now to FIGS. 1 and 2, power means 46 is operatively connected to a switch means indicated generally at 48 which includes a temperature control means in the form of a dial portion 50 and a capillary portion 52.

By adjusting the tension of switch bar 54 with dial portion 50 and the expansion and contraction of capillary portion 52 according to the temperature of cold side 30, the switch bar 54 is opened and closed to automatically control the temperature of cold side 30.

When switch bar 54 is closed, current passes through to fan means 42 and the primary coil of a transformer indicated generally at 56. Current is then induced in the secondary coil 57 and the alternating current from power means 46 is changed to direct current by rectifiers 58 and 60.

This direct current passes into one side and out of the other side of hot side 32 and then through electrical choke 62 back to the secondary coil 57 to complete the circuit.

In operation, the dentist or his assistant starts the apparatus by turning dial portion 50 to the desired temperature setting which typically is between 55 to 65 degrees F. Current then begins to flow to the module 28 and cold side 30 starts to cool.

The temperature of slab 26 lowers accordingly and is controlled by the operation of switch means 48 which automatically maintains the prescribed temperature. Simultaneously, the temperature of hot side 32 begins to rise and the heat so generated is conducted to plate 38 and fins 42. Fan means 42 operates to blow air over fins 40 and out through slots or screened portions, not illustrated, in lower compartment 24 to disspiate the heat generated by hot side 32.

After the slab 26 has reached the desired temperature, the dentist simply swings upper compartment 22 upwardly to expose slab 26. The dentist then mixes the dental cement on slab 26 at the proper temperature which he can easily and simply control and thereby render a better health service to his patient.

While the form of embodiment of the present invention as herein disclosed constitutes a preferred form, it is to be understood that other forms might be adopted, all coming within the scope of the claims which follow:

I claim:

1. An apparatus for cooling dental cements comprising, in combination, housing means; a removable mixing slab means mounted in said housing means; thermoelectric cooling means in heat conducting relationship with said slab means; plate means in heat conducting relationship with said cooling means; fan means disposed in said housing means to remove the heat generated by said cooling means; and temperature control means operatively connected to said cooling means for automatically controlling the temeprature of said cooling means.

2. An apparatus for cooling dental cements comprising, in combination, housing means including an upper portion hinged to open upwardly; mixing slab means mounted in said upper portion; a thermoelectric module disposed in said housing means and including a hot side and a cold side, said cold side being in heat conductive relationship with said slab means; plate means in heat conductive relationship with said hot side of said module; cooling means disposed in said housing means for cooling said plate means; power means operatively connected to said module and said cooling means; and temperature control means operatively connected to said module and said power means for automatically controlling the temperature of said module.

3. An apparatus for cooling dental cements comprising, in combination, housing means; removable mixing slab means mounted in said housing; thermoelectric cooling means mounted in said housing including a cold side and a hot side, said cold side being in heat conductive relationship with said slab means; a plurality of heat conducting plates in heat conductive relationship with said hot side of said cooling means; fan means disposed in said housing means for cooling said heat conducting plates; switch means operatively connected to said cooling means and said fan means; temperature control means operatively connected to said cooling means and said switch means including temperature sensing means for sensing the temperature of said cooling means; and power means operatively connected to said switch means, said cooling means and said fan means.

4. An apparatus for cooling dental cements comprising, in combination, housing means; mixing slab means being composed of a material of high conductivity and removably mounted in said housing means; a thermoelectric module mounted in said housing means including a hot side and a cold side, said cold side being in heat conductive relationship with said slab means; a plurality of heat conducting plates in heat conductive relationship with said hot side of said module; fan means disposed in said housing means for cooling said heat conducting plates; power means operatively connected to said module and said fan means; and temperature control means operatively connected to said module and said power means for automatically controlling the temperature of said cold side of said module.

5. An apparatus for cooling dental cements comprising, in combination, housing means; mixing slab means removably mounted in said housing means; thermoelectric cooling means disposed in said housing and including a cold side and a hot side, said cold side being in heat transfer relationship with said slab means; heat conducting plate means mounted in said housing means in heat transfer relationship with said hot side; insulating means isolating said slab means from said plate means; fan means disposed in said housing means for cooling said plate means; switch means operatively connected to said fan means and said thermoelectric cooling means; temperature control means operatively connected to said switch means; and power means operatively connected to said switch means.

6. An apparatus for cooling dental cements comprising, in combination, a housing means; a mixing slab mounted in said housing; refrigeration means mounted in said housing means including a cold plate and a hot plate, said cold plate being in heat transfer relationship with said mixing slab; cooling means to dissipate the heat generated in said hot plate; temperature control means operatively connected to said refrigeration means including a switch means and thermostat means for automatically controlling the temperature of said mixing slab; and power means operatively connected to said switch means.

References Cited by the Examiner

UNITED STATES PATENTS

| | | | |
|---|---|---|---|
| 1,980,533 | 11/1934 | Kile | 62—458 |
| 2,759,339 | 8/1956 | Kundert | 62—458 |
| 2,970,449 | 2/1961 | Sichorn | 62—3 |
| 2,984,077 | 5/1961 | Gaskill | 62—3 |
| 3,176,472 | 4/1965 | Cox | 62—3 |
| 3,177,670 | 4/1965 | Boehmer | 62—3 |

WILLIAM J. WYE, *Primary Examiner.*